W. U. WATSON.
GREASE GUN.
APPLICATION FILED AUG. 22, 1919.
1,374,263.
Patented Apr. 12, 1921.
2 SHEETS—SHEET 1.
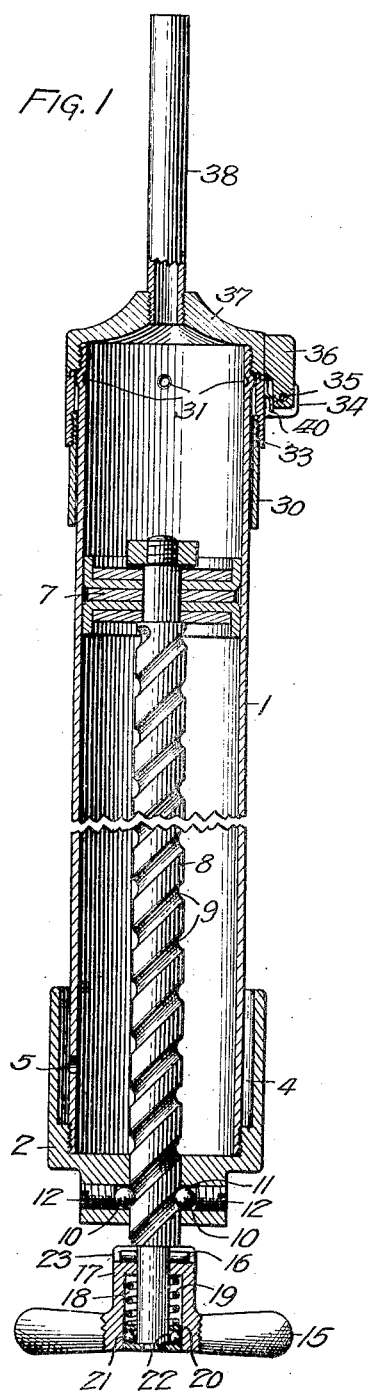
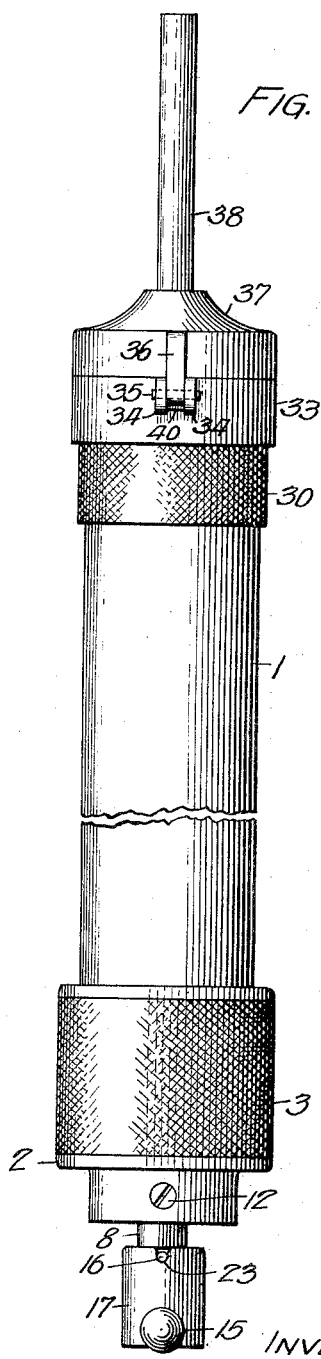
INVENTOR:
WILLIAM U. WATSON,
BY Cheever & Cox
ATTYS.

W. U. WATSON.
GREASE GUN.
APPLICATION FILED AUG. 22, 1919.
1,374,263.
Patented Apr. 12, 1921.
2 SHEETS—SHEET 2.
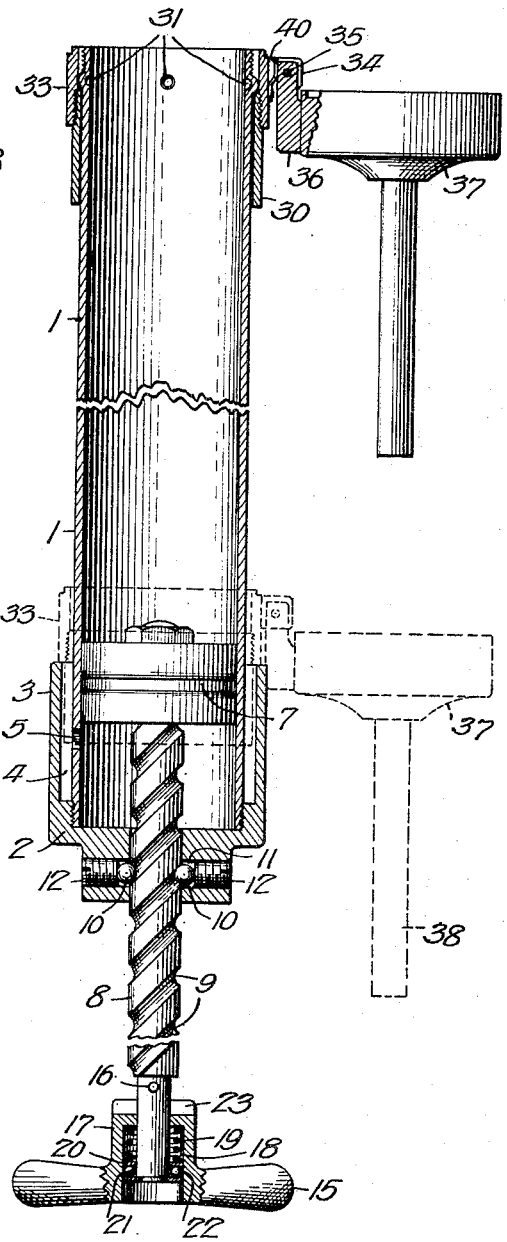
INVENTOR:
WILLIAM U. WATSON,
BY Cheever & Cox
ATTYS.

UNITED STATES PATENT OFFICE.

WILLIAM U. WATSON, OF CHICAGO, ILLINOIS.

GREASE-GUN.

1,374,263.　　　　Specification of Letters Patent.　　Patented Apr. 12, 1921.

Application filed August 22, 1919. Serial No. 319,106.

*To all whom it may concern:*

Be it known that I, WILLIAM U. WATSON, a citizen of the United States, residing at Chicago, in the county of Cook and State of Illinois, have invented a certain new and useful Improvement in Grease-Guns, of which the following is a specification.

My invention relates to grease guns and the underlying object of the invention is to promote the ease and cleanliness and completeness with which devices of this character may be filled. Another object is to promote the ease and simplicity with which the contents may be ejected.

I accomplish my objects by the mechanism illustrated in the accompanying drawings in which—

Figure 1 is an axial section of a grease gun embodying my invention.

Fig. 2 is a side view of the same.

Fig. 3 is an axial section showing the parts in changed position from Fig. 1.

Fig. 4 is an enlarged detail sectional view showing the mechanism by which the cylinder head tends to remain in open position when open.

Like numerals denote like parts throughout the several views.

In the particular form selected to illustrate the principle of the invention the device has a cylinder 1 adapted to contain the grease. The rear end of the cylinder is closed by a cap 2 which, by preference, is screwed tightly in place and remains there permanently. The cap has an annular extension 3 which is preferably integral with it and is spaced from it to form a chamber 4, as best shown in Figs. 1 and 3. This cap with its extension forms a hand grip and it is desirable that its external surface be knurled to enhance the security with which the operator may grasp the device. The cylinder has one or more vents 5 at the side leading into the chamber 4 to permit the passage of air.

Within the cylinder is a plunger or piston 7 which is swiveled to and actuated by a piston rod 8. The advantage of the swivel connection is that the rod may be rotated about its axis without rotating the plunger; hence the frictional resistance of the plunger against the sides of the cylinder does not hinder the rotation of the rod. The rod has two helical grooves 9 adapted to receive the balls 10 located in a transverse bore 11 formed in the rear end of the cap. By preference the pitch is quite steep. The outer ends of the bore are closed by screw plugs 12 which back up the balls and hold them in the grooves 9. The consequence is that by rotating the rod about its longitudinal axis it will be screwed in or screwed out depending upon the direction in which it is rotated. In practice, the parts are so positioned that the balls have a slight play so as to be free to rotate and consequently the friction is reduced to a very low point.

The rod is manipulated by means of a handle 15 and clutch mechanism which, by preference, are of special design. In the design shown, a pin 16 passes transversely through the rod near the rear end and is rigidly fastened. The handle has a cylindrical boss or barrel 17 in which is formed a cylindrical chamber 18. Within this chamber and surrounding the rod, is a helical compression spring 19. The forward end of the spring bears against the bottom or forward end of the chamber 18, while the rear end bears against a washer 20. This washer is of small enough diameter to slide freely within the chamber. Behind the washer are anti-friction balls 21 which bear against a plate 22 rigidly fastened to the rear end of the rod. The plate is also small enough in diameter to slide freely within the chamber. The forward end of barrel 17 has a notch 23 adapted to fit over the pin 16 as shown in Figs. 1 and 2. Under normal conditions the spring holds the notch seated upon the pin as in Figs. 1 and 2, with the result that when the handle is rotated in either direction it will cause the piston rod to rotate in the same direction. But if the operator exerts a backward pull on the handle the pin 16 is disengaged—that is, the clutch is released, as shown in Fig. 3, and the piston rod moves outward and at the same time rotates under the camlike action of the sides of the grooves acting against the balls 10. Thus when it is desired to retract the plunger, all that is necessary is for the operator to firmly grasp the cylinder 1 in one hand and with the other hand pull backward upon the handle, which thus automatically disengages the pin and yet permits the rod to rotate backward and hence move longitudinally rearward to a position for refilling of the cylinder.

A ring 30 makes a sliding fit with the outside of the cylinder, this ring being small enough, according to the preferred design, to slip into the chamber 4 in cap 2, as shown in dotted lines in Fig. 3. The ring is prevented from slipping over the forward end of the cylinder by one or more bosses 31 formed in the sides of the cylinder by a peening tool or in any other suitable manner.

A collar 33 screws onto the forward end of ring 30 and at one side is provided with a pair of ears or lugs 34 which support a pin 35 forming a pivot for a lug 36 fastened to or integral with the sides of the cylinder head 37. Thus the head is hinged to collar 33 which, in turn, is rigidly secured to the ring 30. The cylinder head is provided with the usual delivery tube or nozzle 38.

It is desirable that the hinged end of the lug 36 be squared and that a leaf spring 40 be interposed between it and the side of the collar 33 in such manner that when the cylinder head 37 is in acting position, as shown in Fig. 1, the spring will tend to hold it there and when it is swung to non-acting or filling position as shown in Fig. 4, also in full and dotted lines in Fig. 3, the spring will tend to hold it there also. In other words, the adjacent corner of the lug slides past neutral position in going from closed to open position and vice versa and hence the cylinder head tends to remain in one extreme position or the other after the manner of a jack-knife or pen-knife. The advantage is that when the device is being filled, the cylinder head will maintain itself in open or filling position and not flop around and interfere with the filling operation.

It will be remembered that the cylinder head is mounted on a collar 33 which, in turn, is secured to the slidable and rotatable ring 30, hence when the cylinder head is in axial alinement with the cylinder, it and the collar and ring may be rotated about the longitudinal axis of the device. This makes it possible to screw the cylinder head onto the forward or outer end of the cylinder; and for the purpose I have externally threaded the outer end of the cylinder and internally threaded the cylinder head.

In operation, the plunger is actuated in the manner previously described. It is advanced to eject the grease by rotating the handle in a positive direction, the balls 10 acting against the sides of the cam groove and causing the piston rod and plunger to advance. When it is desired to retract the plunger for refilling, the handle is simply pulled backward whereupon its notched barrel disengages the pin 16 and the pull of the handle causes the rod to simultaneously move outward and to rotate. When the cylinder contains grease, and is in operating condition, the cylinder head occupies the position shown in Figs. 1 and 2, and a forward movement of the plunger forces the grease out through the nozzle.

When refilling is required the plunger and piston rods are retracted either by negatively rotating the handle 16 or by simply pulling outward upon it, as above explained. The device is further prepared for the refilling operation by unscrewing the cylinder head from the forward end of the cylinder and swinging it back to the position shown in full lines in Fig. 3. Thereupon the cylinder head, together with the collar 33 and ring 30, is slipped back to the position shown in dotted lines in Fig. 3. This leaves the entire forward end of the cylinder stripped and free to be plunged into the can of grease. It is unnecessary to use a paddle to first scoop the grease out of the can and then scrape it off into the cylinder and then compact the grease in the cylinder as best one may. The cylinder is simply forced into the grease as it lies in the can and consequently is completely and easily filled. After the cylinder has been withdrawn from the grease the sides are of course greasy, but this is remedied and the grease is stripped from the sides by the simple action of slipping the ring 30 forward to the front end of the cylinder. When it has reached this position the cylinder head is in a position to enable it to be swung back over the end of the cylinder. As a final operation the cylinder head is rotated in a direction to screw it onto the threaded outer end of the cylinder. The device is then filled ready for use.

It will be observed that the device contains little, if any, more material than is employed in the manufacture of ordinary grease guns. The plunger is moved forward by rotating the piston rod and is retracted by simply pulling on the handle. It may be filled by simply plunging it into a container of grease and after being withdrawn the outer surface of the cylinder may be cleaned by simply slipping the stripping ring 30 forward to normal position adjacent to the forward end of the cup. As the parts are simple in construction they are durable and cannot readily get out of order. The hand grip 2, 3, is always exposed, where it may be grasped by the operator and the overall length of the device at no time exceeds the normal length of a device of this character and capacity. The advantage in having the stripping ring telescope in the cap 2 is that a greater length of the cylinder is exposed and hence may be plunged into the grease without smearing the outside of said ring and of the collar 33.

Having thus described my invention what I claim as new and desire to secure by Letters Patent, is:

1. A grease gun having a cylinder, a piston rod and plunger, an apertured cylinder head through which the grease may be ejected, and a stripping ring slidable along the cylinder for stripping the grease from the external surfaces of the cylinder after it has been plunged into a body of grease.

2. A grease gun having a cylinder, plunger, and piston rod, the rear end of the cylinder being adapted to be gripped at all times by the operator, an apertured cylinder head for closing the forward, delivery end of the cylinder, and a ring adapted to support the cylinder head, said ring being slidable toward the rear, gripping end of the cylinder.

3. A grease gun having a cylinder provided with a hand grip at the rear end, a piston rod and plunger, an apertured cylinder head for closing the forward end of the cylinder, and a ring for supporting said cylinder head, said ring being slidable toward and from said hand grip.

4. A grease gun having a cylinder provided with a hand grip at its rear end, a plunger within the cylinder, a piston rod in the plunger, a cylinder head having an aperture through which the grease may be ejected, and a stripping ring for stripping grease from the external surface of the cylinder, the hand grip being chambered for permitting the ring to be slid into it when the cylinder is being plunged into the grease.

5. A grease gun having a cylinder provided with a cap at its rear end, the cap having a cylindrical extension spaced from the cylinder to form a chamber, a piston, a plunger, a cylinder head having an aperture through which the grease may be ejected, and a stripping ring slidable and rotatable upon the cylinder, said ring being adapted to slip into said chamber, and the cylinder head being hinged to the ring.

6. A grease gun having a cylinder, a plunger, a piston rod for actuating the plunger, a ring slidable along the cylinder, a cylinder head having an aperture through which the grease may be ejected, the cylinder head being pivoted to the ring, and positioning means interposed between the ring and the cylinder head and adapted to yieldingly hold the cylinder head in a definite position out of axial alinement with the cylinder.

7. A grease gun having a cylinder, a plunger, a piston rod, a stripping ring slidable along the cylinder, a cylinder head pivoted to the ring, and a leaf spring on the ring adapted to yieldingly hold the cylinder head in a definite angular position relative to the ring.

8. A grease gun having a cylinder, a plunger, a piston rod, a cylinder head having an aperture through which the grease may be ejected, said cylinder head being adapted to screw upon the end of the cylinder, a ring slidable and rotatable upon the cylinder, said cylinder head being pivoted to the ring, and a stop for preventing the ring from slipping off the forward end of the cylinder.

9. A grease gun having a cylinder, a plunger, a piston rod, a cylinder head having an aperture through which the grease may be ejected, a ring slidable upon the cylinder, said cylinder head being adapted to be secured to the forward end of the cylinder in axial alinement with it, said cylinder head being articulately connected to and adapted to be supported by the ring, and means at each end of the cylinder for preventing the ring from projecting materially beyond either end of the cylinder.

10. A grease gun having a cylinder, a piston rod, a plunger actuated by said rod, said rod having a helical groove, a projection substantially in fixed position relative to the cylinder and extending into said groove, and a handle rotatable and slidable upon said rod, said handle being adapted to engage the rod when slid to one position on it, and disengage it when slid to another position on it.

11. A grease gun having a cylinder, a piston rod, a plunger actuated by said rod, the piston rod having a helical groove, a projection substantially in fixed position relative to the cylinder, said projection extending into said groove, a handle slidable along the piston rod and rotatable independently of it, and a clutch for forcing the piston rod to rotate in unison with the handle, said clutch being releasable when the handle is pulled rearward along the rod.

12. A grease gun having a cylinder, a piston rod, a plunger actuated by said rod, the piston rod having a helical groove in the side, a projection substantially fixed relatively to the cylinder and extending into said groove, a handle rotatable independently of said rod and also movable lengthwise of it for a limited distance, a clutch adapted to connect the handle and the rod when the handle is in acting position and disconnect them when the handle is moved longitudinally with respect to the rod, and means for normally holding the handle and clutch in acting position.

13. A grease gun having a cylinder, a piston rod, a plunger actuated by said rod, the piston rod having a helical groove, a ball held in substantially fixed position relatively to the cylinder, and projecting into said helical groove, a handle slidable longitudinally upon the piston rod behind the cylinder, and being rotatable independently of the rod, a clutch for enabling the handle to rotate the rod, said clutch being releasable when the handle is moved rearward lengthwise of the rod, and a spring for holding the clutch in acting position.

14. A grease gun having a cylinder, a piston rod, a plunger actuated by said rod, a piston rod having double helical grooves in the side, said grooves having a steep pitch, a pair of anti-friction balls mounted in substantially fixed position relatively to the cylinder, said balls projecting part way into said grooves, a handle movable longitudinally and rotatably relatively to the piston rod, a clutch for connecting the handle and the piston rod, and a spring adapted to urge the handle in a forward direction to thereby hold the clutch in engagement, said clutch being releasable when an outward pull is exerted upon the handle.

In witness whereof, I have hereunto subscribed my name.

WILLIAM U. WATSON.